United States Patent
Meixner et al.

(10) Patent No.: US 8,151,665 B2
(45) Date of Patent: Apr. 10, 2012

(54) SHIFT DEVICE FOR A SPEED CHANGE TRANSMISSION IN MOTOR VEHICLES

(75) Inventors: Christian Meixner, Ingolstadt (DE);
Mario Schenker, Ingolstadt (DE);
Johann Märkl, Ingolstadt (DE)

(73) Assignee: Audi AG, Ingolstadt (DE)

( * ) Notice: Subject to any disclaimer, the term of this patent is extended or adjusted under 35 U.S.C. 154(b) by 579 days.

(21) Appl. No.: 12/306,123

(22) PCT Filed: Jun. 22, 2007

(86) PCT No.: PCT/EP2007/005523
§ 371 (c)(1),
(2), (4) Date: Feb. 6, 2009

(87) PCT Pub. No.: WO2007/147616
PCT Pub. Date: Dec. 27, 2007

(65) Prior Publication Data
US 2009/0235771 A1    Sep. 24, 2009

(30) Foreign Application Priority Data
Jun. 23, 2006 (DE) .......................... 10 2006 028 784

(51) Int. Cl.
*F16H 59/04* (2006.01)

(52) U.S. Cl. .................................................. 74/473.36
(58) Field of Classification Search ............... 74/473.36; 277/311, 350, 500; 384/151
See application file for complete search history.

(56) References Cited

U.S. PATENT DOCUMENTS

| | | | |
|---|---|---|---|
| 2,437,586 A * | 3/1948 | Aber ............................. 277/582 |
| 4,496,161 A * | 1/1985 | Fischer ......................... 277/311 |
| 4,827,793 A * | 5/1989 | Loeffler et al. ............. 74/473.3 |
| 5,560,254 A * | 10/1996 | Certeza ..................... 74/473.27 |
| 6,736,020 B2 * | 5/2004 | Koyama et al. .............. 74/335 |

FOREIGN PATENT DOCUMENTS

| | | |
|---|---|---|
| DE | 101 58 729 A1 | 6/2003 |
| DE | 20 2004 013699 | 1/2006 |
| WO | WO 2005/064281 A | 7/2005 |

* cited by examiner

*Primary Examiner* — Vicky Johnson
(74) *Attorney, Agent, or Firm* — Novak Druce + Quigg LLP

(57) ABSTRACT

A shift device for a speed change transmission in motor vehicles having at least one selector rod which is movably supported in the gear housing in cross walls, by means of which rod the transmission steps in the gear housing can be shifted. The selector rod on one end penetrates a cross wall of the transmission, which wall separates the oil compartment, and by means of a plastic sleeve, which is sprayed onto the selector rod, is guided and sealed in the corresponding through hole of the cross wall of the transmission.

15 Claims, 3 Drawing Sheets

SHIFT DEVICE FOR A SPEED CHANGE TRANSMISSION IN MOTOR VEHICLES

The invention relates to a shift device for a speed change transmission in motor.

Spraying plastic sleeves onto the ends of selector rods for their support in the corresponding cross walls of the gear housing is generally known in shift devices with selector rods in sheet metal construction (cf. DE 196 01 623 C2). The selector rods can be directly connected to the speed selection units by way of the corresponding connecting means in automatic transmissions with electrohydraulically controlled speed selection units (e.g., DE 103 42 389 A1).

The object of the invention is to propose a shift device of the generic type which is especially suited for automatic transmissions and which is favorable in terms of production engineering.

SUMMARY OF THE INVENTION

It is proposed according to the invention that the selector rod on one end penetrates the cross wall of the transmission, which wall separates the oil compartment, and by means of a plastic sleeve which has been sprayed onto the selector rod, it is guided and sealed in the corresponding through hole of the cross wall of the transmission.

In particular, the plastic sleeve can have a radially outer, peripheral, annular groove into which a gasket is inserted which interacts with the through hole. Thus, materials which meet the different construction requirements for the plastic sleeve (workability, wear resistance, gliding properties) and the gasket (especially sealing properties) can be advantageously used.

The gasket in particular can have a configuration which seals in both shift directions, especially when another oil compartment, for example, for wet clutches, hydraulic controls, etc., is connected to the indicated oil compartment of the transmission or to the cross wall which separates the oil compartment.

In this case, on the outer periphery the gasket can have two peripheral sealing projections which act in the two shifting directions, and which in addition to relatively low shifting forces ensure reliable sealing.

In one advantageous development of the invention the selector rod viewed in cross section can be made, for example, rectangular so that the gasket can be easily made rotationally symmetrical relative to its outer periphery.

Furthermore, the selector rod can bear functional means which are located outside of the cross wall of the gear housing, which wall separates the oil compartment, the through hole in the cross wall and the plastic sleeve of the selector rod being designed in diameter of such dimension that the functional means can be mounted with the selector rod as a mounting unit through the through hole.

In particular, the functional means can be position transmitters which are mounted on the selector rod and/or can be connecting means which can be connected to a speed selection unit and which are connected detachably or permanently to the selector rod in a pre-installation step and then can be installed in the gear housing as a mounting unit through the through hole.

In an automatic speed change transmission with 5 or 6 forward gears and one reverse gear, for example, three selector rods for the forward gears and one selector rod for the reverse gear can be routed through the cross wall, which separates the oil compartment, in corresponding through holes.

Finally, a steel bearing bush, by means of which the durability of the selector rod supports and seals can be increased, can be inserted at least into one of the through holes of the cross wall, which separates the oil compartment—preferably into all through holes.

DETAILED DESCRIPTION OF THE PREFERRED EMBODIMENTS OF THE INVENTION

Figure 1:
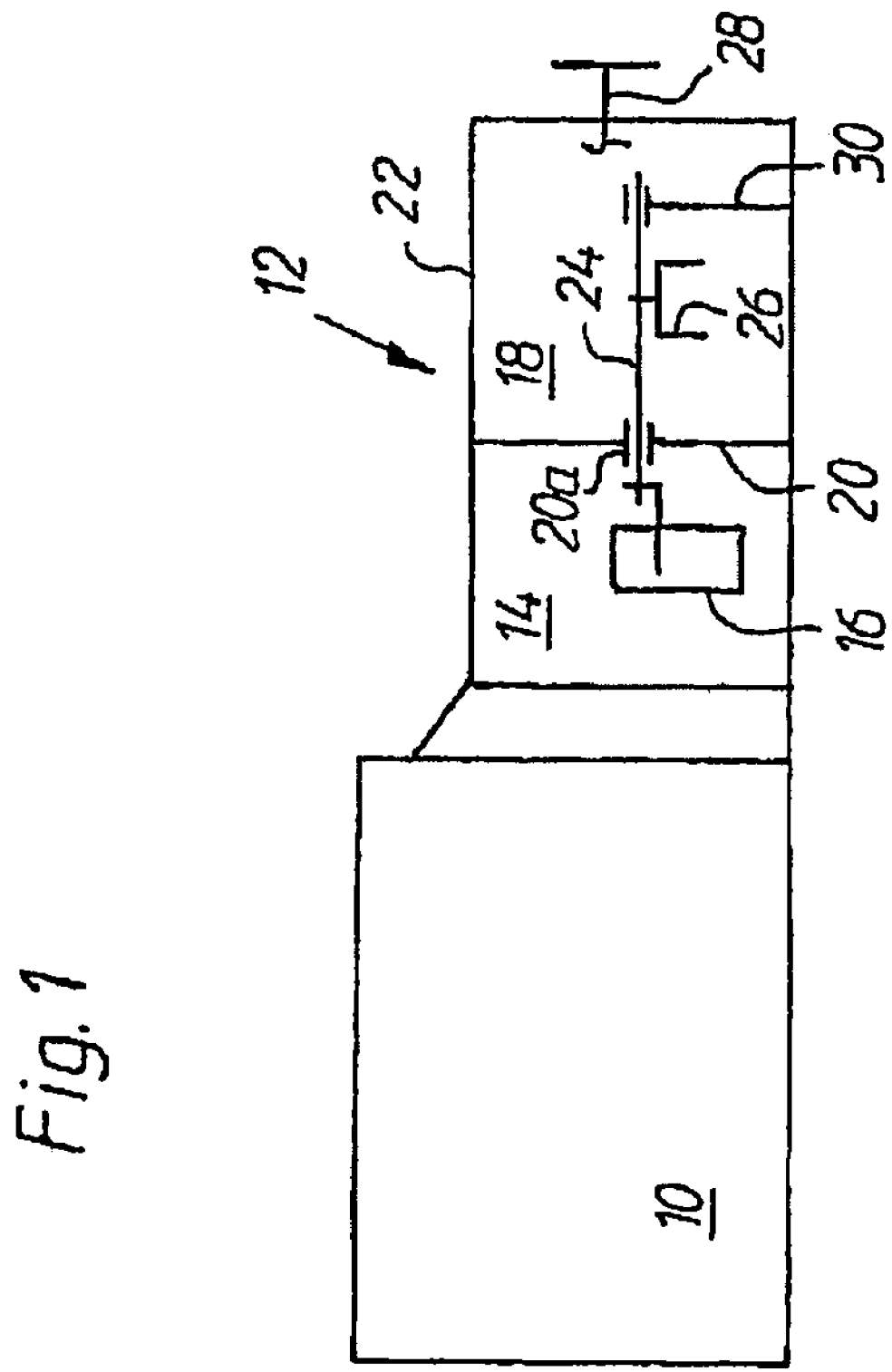
FIG. 1 shows a schematic view of a drive assembly for motor vehicles having an automatic speed change transmission, with a selector rod which penetrates a cross wall which separates the oil compartment.

FIG. 1 shows as an outline sketch a drive assembly for motor vehicles with an internal combustion engine 10 and a downstream speed change transmission 12. The assemblies 10, 12 can be of any conventional design, if not described.

In the speed change transmission 12, which is made as an automatic transmission, in the first gear chamber 14 there are clutch means which are not detailed (e.g., a hydraulically actuated double clutch), electrohydraulic control means or speed selection units 16.

In the second gear chamber 18, which is divided by the cross wall 20 of the housing 22 of the speed change transmission 12, which wall separates the oil compartment, the gear shafts, the gear sets necessary to form the transmission steps, synchronous clutches, etc., are positioned in an opaque manner.

Furthermore, in the speed change transmission 12, the selector rods 24 (only one selector rod 24 is shown) are movably supported and in a conventional design bear the shift forks 26 and in a conventional design interact with the synchronous clutches of the speed change transmission 12 for shifting of the transmission steps. The selector rods 24 are connected to the speed selection units 16 within the gear chamber 14 and can thus be moved out of the neutral position into both shift directions.

The output to the driven wheels of the motor vehicle can take place by way of an output shaft 28 of the speed change transmission 12 and/or by way of a front differential which is not shown.

The selector rods 24 are supported to be able to move axially in through holes 20a of the cross wall 20 which separates the oil compartment and on the other end in one (or more) cross wall(s) 30 of the housing 22 of the speed change transmission 12.

The gear chambers 14, 18 can be filled with different gear oil or hydraulic oil so that there are the corresponding supports and seals on the gear shafts and selector rods 24 which are routed through.

Figure 2:
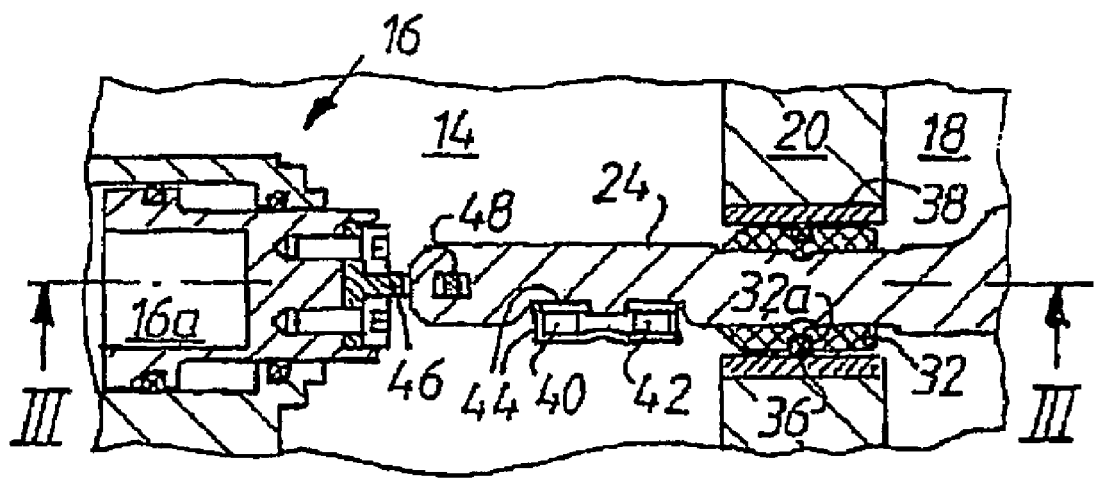
FIG. 2 shows a sectional view of the partially illustrated cross wall which separates the oil compartment and the selector rod of the transmission as shown in FIG. 1.
Figure 3:
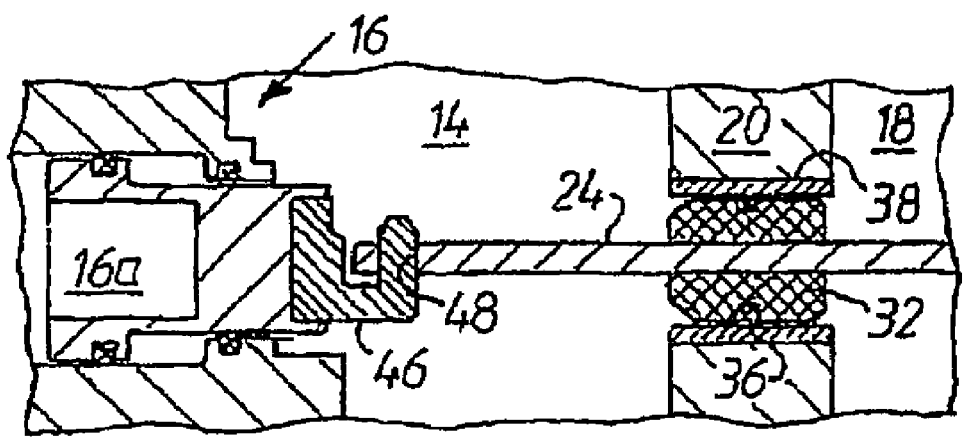
FIG. 3 shows a sectional view according to line III-III of FIG. 2 through the cross wall which separates the oil compartment and the selector rod.

For this purpose, as shown in FIGS. 2 and 3 in the region of the cross wall 20 which separates the oil compartment, a plastic sleeve 32 is sprayed onto the selector rod 24 and thus forms, with its rotationally symmetrical outer periphery a support for the selector rod 24 which is routed through the cross wall 20. The second support (cf. FIG. 1) of the selector rod 24 in the cross wall 30 can be a mounting on roller bearing which guides the selector rod 24 in a twist-proof manner, which is not shown.

Figure 4:
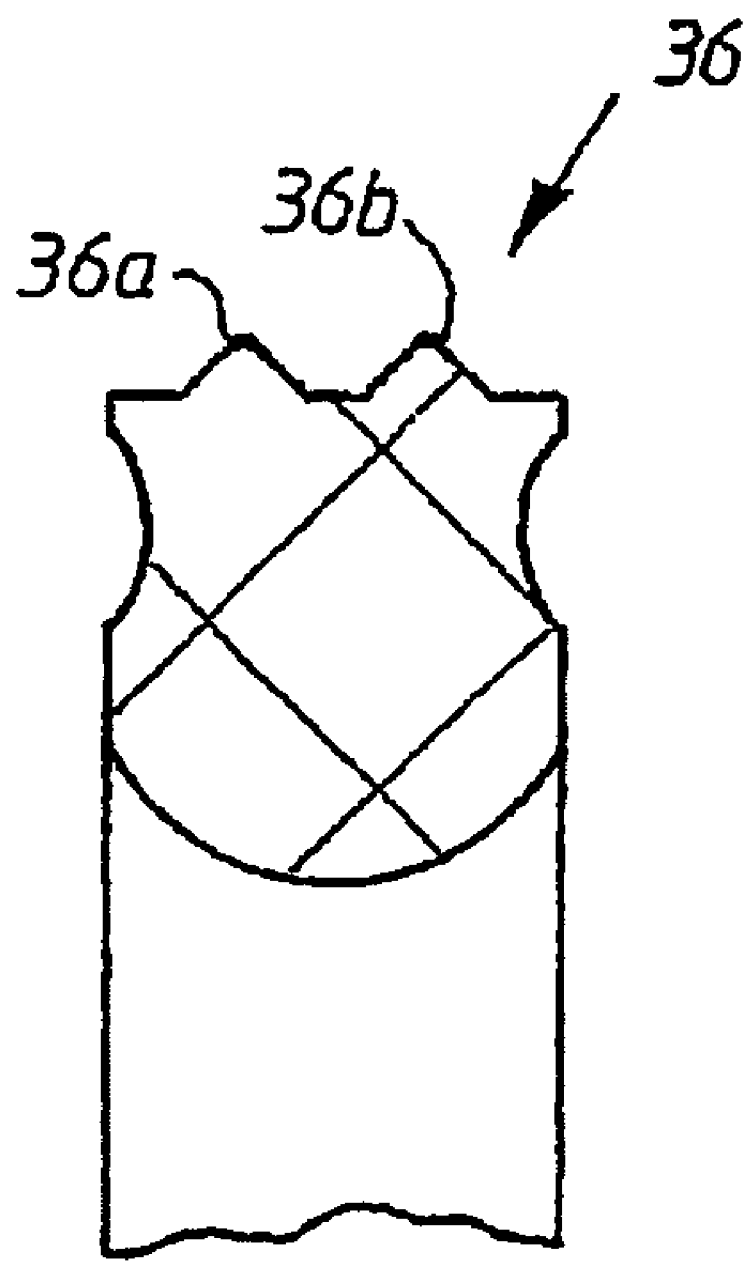
FIG. 4 shows a cross section through the gasket of the plastic sleeve of the selector rod in an enlargement.

The plastic sleeve 32 on its outer periphery and in its vertical center plane has an outer groove 32a into which an elastic gasket 36 (cf. FIG. 4) is inserted. The gasket 36 for reliable sealing in both shifting directions of the selector rod 24 has two seal projections 36a, 36b which run annularly along the periphery and which produce essentially only line contact.

Furthermore, a bearing bush 38 of steel which interacts accordingly with the gasket 36 and the outer periphery of the plastic sleeve 32 is inserted into the through hole 20a.

The selector rod 24 on its region which projects into the gear chamber 14—as is shown in particular in FIG. 2—bears two position transmitters 40, 42 which are formed by permanent magnets and which are permanently connected to the selector rod 24 by means of a pole lamination 44 and are used as functional means of a conventional evaluation circuit for speed detection, for example, in conjunction with adjacent reed switches or electrical measurement coils as the position sensors.

Furthermore, the selector rod 24 is drive-connected by way of connecting means 46, 48 (cf. FIG. 3) to the speed selection unit 16 and to its the actuating piston 16a. The connecting means as shown can have a hook-shaped connecting part 46 on the actuating piston 16a and a continuous recess 48 that is machined into the selector rod 24, the connecting part 46 being inserted transversely to the shifting direction of the selector rod 24 into the recess 48 when the speed selection unit 16 is installed. The connecting means 46, 48, however, can also be made differently, for example, with a connecting flange on the selector rod 24.

The invention claimed is:

1. A shift device for a speed change transmission in motor vehicles having at least one selector rod which is movably supported in the gear housing in cross walls, by means of which rod the transmission steps in the gear housing can be shifted wherein the selector rod on one end penetrates a cross wall of the transmission, which wall separates the oil compartment, and by means of a plastic layer, which is sprayed onto the selector rod, is guided and sealed in the corresponding through hole of the cross wall of the transmission, and wherein the plastic layer has a radially outer, peripheral annular groove into which a gasket is inserted which interacts with the through hole.

2. The shift device according to claim 1 wherein the gasket has a configuration which seals in both shifting directions.

3. The shift device according to claim 2 wherein the gasket on the outer periphery has two peripheral sealing projections which act in both shifting directions.

4. The shift device according to claim 1 wherein the selector rod viewed in cross section is made preferably rectangular and the plastic layer is made rotationally symmetrical relative to its outer periphery.

5. The shift device according to claim 1 wherein the selector rod bears functional means, which are located outside of the cross wall of the gear housing, which wall separates the oil compartment, and that the through hole in the cross wall and the plastic layer of the selector rod are designed to be of such dimension in diameter that the functional means can be mounted with the selector rod as a mounting unit through the through hole.

6. The shift device according to claim 5 wherein the functional means are position transmitters which are mounted on the selector rod and/or are connecting and cooperable means which can be connected to a speed selection unit.

7. The shift device according to claim 1 including a bushing formed of one of steel and a lightweight metal be inserted into the through hole of the cross wall.

8. A shifting member for a speed changing transmission having a housing defining a compartment provided with a speed selector unit, and an opening communicating with said compartment, comprising:
a rod displaceable along the length thereof insertable through said housing opening, having an insertable end operatively connectable with said speed selector unit and a gasket mounted thereon provided with a pair of longitudinally spaced, transversely projecting protruding portions engageable in sealing relation with a surface of said housing opening wherein said rod is formed of a metal provided with a layer of plastic material about the periphery thereof, having a peripheral groove in which said gasket is seated.

9. A member according to claim 8 including a metallic bushing inserted in said housing opening wherein said protruding portions of said gasket engage said bushing.

10. A member according to claim 8 wherein said layer of plastic material is applied by spraying said material on said rod.

11. A member according to claim 8 wherein said rod includes at least one position transmitter disposed on a portion thereof insertable in said housing opening within said compartment, displaceable into and out of excitation relationship with at least one position sensor disposed in said compartment, adjacent a line of travel of said rod and operatively connectable to a detection circuit.

12. A member according to claim 11 wherein the configuration of said rod provided with said position transmitter and said gasket is sufficiently confined to permit said rod to be freely inserted through said housing opening and said gasket to sealing engage the surface of said housing opening upon assembly of said transmission.

13. A member according to claim 12 wherein said position transmitter is disposed in a recess of said rod.

14. A member according to claim 12 wherein said position transmitters is magnetic.

15. A member according to claim 12 wherein said position transmitters comprises magnetic particles disposed in a plastic material deposited on said rod.

* * * * *